United States Patent [19]

Vorchheimer

[11] 4,118,355

[45] Oct. 3, 1978

[54] METHOD AND COMPOSITION OF A POLYMER IN CONVENIENT LIQUID FORM

[75] Inventor: Norman Vorchheimer, Buckingham, Pa.

[73] Assignee: Betz Laboratories, Inc., Trevose, Pa.

[21] Appl. No.: 896,949

[22] Filed: Apr. 17, 1978

Related U.S. Application Data

[63] Continuation-in-part of Ser. No. 791,742, Apr. 28, 1977, abandoned, which is a continuation-in-part of Ser. No. 695,510, Jun. 11, 1976, abandoned.

[51] Int. Cl.$^2$ .............................................. C08L 33/26
[52] U.S. Cl. ...................... 260/29.6 PT; 260/29.6 H; 260/29.6 E; 260/29.6 HN; 260/29.6 SQ; 260/29.6 ME
[58] Field of Search ................... 260/29.6 PT, 29.6 H, 260/29.6 E, 29.6 HN, 29.6 SQ, 29.6 ME

[56] References Cited

U.S. PATENT DOCUMENTS

| | | | |
|---|---|---|---|
| 3,163,619 | 12/1964 | Sheats et al. | 260/29.6 E |
| 3,509,113 | 4/1970 | Monagle et al | 260/79.3 |
| 3,763,071 | 10/1973 | Katzer et al. | 260/29.6 E |
| 3,779,969 | 12/1973 | Slagel et al. | 260/29.6 E |
| 3,817,891 | 6/1974 | Keas | 260/29.6 E |
| 3,940,356 | 2/1976 | Byrnes | 260/29.6 E |
| 3,969,329 | 7/1976 | Hirata et al. | 210/54 |

FOREIGN PATENT DOCUMENTS 48,903 12/1972 Japan ............................. 260/29.6 E

*Primary Examiner*—M. J. Welsh
*Attorney, Agent, or Firm*—Alexander D. Ricci; Steven H. Markowitz

[57] ABSTRACT

A polymer in convenient liquid form is disclosed which comprises a mixture of the polymer with a first solvent in which the polymer is soluble and a second solvent which is co-soluble with the first solvent and in which the polymer is not soluble. A method for forming the polymer in convenient liquid form is also disclosed.

32 Claims, No Drawings

METHOD AND COMPOSITION OF A POLYMER IN CONVENIENT LIQUID FORM

This is a continuation-in-part application of Ser. No. 791,742 filed Apr. 28, 1977, which is a continuation-in-part application of Ser. No. 695,510 filed June 11, 1976, both now abandoned.

As is well known various water-soluble polymers have been developed which, in aqueous solution, demonstrate excellent flocculation and/or coagulation properties. These polymers are in use, for example, in the clarification of aqueous mediums, in papermaking operations, in dredging operations, and in the treatment of sewage and waste.

Although such polymers are generally available in particulate form, as already noted they are utilized in aqueous solution. However, difficulty is often experienced in preparing and using the aqueous solutions because of their low solubility and because of the high viscosities of the resulting solutions. For example, only small concentrations of high molecular weight polymer solutions can be made, e.g., 0.25 to 5%, and to accomplish this is expensive and relatively difficult. Numerous methods and various equipment designs have been proposed and in some cases developed for this purpose with limited success; however, the successful apparatus has been very large, complex and expensive. Also for example, a 5% solution having a molecular weight of 8,000,000 resembles a gel and, as can be appreciated, such viscosity renders the solution virtually unusable.

In this light, it can be seen that a need exists for a relatively high concentration, low viscosity aqueous form of a high molecular weight water-soluble polymer (hereafter referred to as a polymer in convenient liquid form). Put another way, a need exists for a method for increasing the concentration of high molecular weight polymers in solvents. In fact, a polymer in convenient liquid form has been achieved using what is known as a water-in-oil emulsion containing the polymer. Reference is made to U.S. Pat. No. 3,734,873 (Anderson et al) in which such a water-in-oil emulsion containing a polymer is described. According to Anderson et al an "aqueous solution" of the polymer is formed by first preparing a water-in-oil emulsion; then polymer as powder is added to the emulsion and agitated to provide a polymer-containing water-in-oil emulsion; and finally the emulsion is inverted to dissolve the polymer in the water, resulting in a polymer-containing oil-in-water emulsion. Reference is also made to British Pat. No. 991,416 in this matter.

Although the noted polymer-containing oil-in-water emulsion provides a relatively high concentration, low viscosity aqueous form of a water-soluble high molecular weight polymer, it has inherent drawbacks. For example, the entry of oil into a cooling water system is highly undesirable. A coating of oil on a cooling water system heat exchange surface will seriously impede heat transfer thereacross. Also, the presence of oil causes biological fouling resulting in loss of heat transfer efficiency and serious pitting of metal surfaces. Another example of the inherent drawbacks associated with the oil-in-water emulsions relates to the presence of oil in a boiler system. As in the water cooling system, oil coated heat transfer surfaces often suffer a serious loss in heat transfer efficiency. Also, the oil can act as an insulator to prevent dissipation of heat from metal surfaces. The resultant increase in metal temperature can cause blistering and loss of boiler tubes and plates. In addition, the oil may combine with boiler water sludge resulting in a pasty mass deposited on the boiler surface. The resultant impairment of circulation and heat transfer could cause starvation of boiler tubes or overheating due to the insulating effect of the oily sludge.

Generally, the present invention is concerned with the inventor's discovery of a novel method of increasing the concentration of a polymer in a solvent in which it is soluble and the resultant novel polymer in convenient liquid form. This novel liquid form polymer indeed overcomes the inherent drawbacks related to the polymer-containing water-in-oil emulsion form in that the use of oil is eliminated. Furthermore, the inventive method accommodates the making of a highly concentrated, low viscosity liquid form of a water-soluble, high molecular weight polymer.

According to the present invention a novel method for increasing the concentration of a polymer in a first solvent for the polymer comprises mixing the first solvent with a second solvent, hereinafter also referred to as a non-solvent, which is mutually co-soluble with the first solvent and in which the polymer is not soluble and adding the polymer thereto. As already stated, the first solvent can be any one or a mixture of the many known liquids which are solvents for the polymer. For example, if solutions of polyacrylamide are to be made, water, glacial acetic acid or mixtures thereof would be suitable as the first solvent. If, for example, a solution of polystyrene is to be made, benzene would be suitable as the first solvent. Also, as already stated, the non-solvent could be any one or a mixture of the many known materials having the properties of being co-soluble with the first solvent and a non-solvent for the polymer. For example, in the case of a polyacrylamide solution, lower alcohols, ethers, glycols or mixtures thereof would be suitable as the second solvent. In the case of, for example, a polystyrene solution, the second solvent could be selected from saturated hydrocarbons, alcohols and glycol ethers. While the present inventive method could be used to effectively increase the concentration of any polymer solution, it is particularly useful for making solutions of polymers having high molecular weights in excess of about 100,000. The preferred polymer has a molecular weight in excess of 1,000,000. The molecular weights could be as high as about 25,000,000.

The present invention can be practiced with respect to any soluble polymer; however, since aqueous solutions of polymers are the most commonly used, the present invention is particularly useful as applied to water-soluble polymers. The term polymer is used to indicate a polymer, copolymer, terpolymer, etc., or mixtures thereof. Water-soluble vinyl addition polymers are preferred. The polymers most commonly used in many industrial applications are acrylamide polymers which include polyacrylamide and its water-soluble copolymeric derivatives, e.g., acrylic acid, methacrylic acid and acrylonitrile. The copolymers contain from about 5 to 95% by weight of acrylamide.

Other water-soluble vinyl polymers are described in U.S. Pat. Nos. 3,171,805; 3,259,570 and 3,418,237 which are incorporated herein by reference. The water-soluble polymers may be either cationic or anionic and, as disclosed by the incorporated patents, the ionic charges are sufficiently slight so that the polymers may also be characterized as nonionic. The polymers may also be polyampholytes.

The relative proportions of the first and second solvents can vary over a wide range with the first solvent being present in an amount as low as about 10% of the total first and second solvent mixture by weight. It is preferred that the lower limit for the first solvent be about 25% of the total noted mixture. The upper limit for the first solvent can be as high as about 90% of the total mixture. It is preferred that the upper limit for the first solvent be about 75%.

It should readily occur to the artisan, having the benefit of the present disclosure, that the polymer can be present in any amount which will properly dissolve in the solvent mixture without forming a gel or becoming unmanageable. Accordingly, the polymer could be present in an amount as small as about 0.25% of the total first solvent-second solvent-polymer mixture on a weight basis. However, about 4% is the preferred lower limit. The upper limit for the amount of the polymer material in the total mixture is about 50%. An upper limit of about 30% is preferred.

It should also readily occur to the artisan, having the benefit of the present disclosure, that the viscosity of the liquid form polymer can vary over a wide range, with the only limitation being that a gel is not formed upon making the polymer solution, or that the solution does not become unmanageable. Stated differently, a polymer in convenient liquid form according to the present invention must be non-gel-like based on the absence of the Weissenberg effect. If the Weissenberg effect is present, the resultant polymeric solution is gel-like and, accordingly, is not considered to be a polymer in convenient liquid form according to the present invention. Based on a Brookfield LVT Model Viscometer, the lower limit can be about 1 cps; however, 5 cps represents the preferred lower limit. Also, 100,000 cps would represent the upper viscosity limit, with 50,000 cps being the preferred upper limit.

The liquid form polymer is preferably prepared by adding the polymer, either as dry polymer or containing some liquid (for example, a partially processed polymer can contain liquid), directly to the solvent mixture. In some instances additional increments of the first and/or second solvents are added to achieve the desired viscosity or stability. Any known mixing device such as a blender, a laboratory propeller-type stirrer, a planetary mixer, a Cowles dissolver or a mixer-emulsifier can be used.

The proper starting proportions of the solvent and non-solvent are determined empirically and are considered to be well within the skill of the art and to involve a minimal amount of experimentation. According to the present inventor's preferred method for making this determination, an arbitrarily chosen ratio of solvent to non-solvent is selected and then adjusted until the mixture attains the desired state of stability and viscosity. The arbitrary ratio is preferably chosen so that the initial mixture has a higher proportion of the non-solvent, in order that the mixture does not go through a high viscosity state which makes agitation and mixing difficult. As already noted, the initial mixture may have to be adjusted using either or both solvent and non-solvent to achieve the desired viscosity or stability. Once the correct ratio is determined, suitable polymer solutions (polymer in liquid form) can be prepared by mixing the correct amounts of solvent and non-solvent and finally adding polymer with agitation.

EXAMPLE I

The above-discussed empirical method of determining the proper relative proportions of the solvent and non-solvent for a high molecular weight polyacrylamide was practiced as follows:

To 100 grams of polyethylene oxide of molecular weight 600 contained in a beaker was added, with agitation, 100 grams of a partially processed cationic, high-molecular weight polyacrylamide, containing 31.5% polymer, 51.4% methanol and 17.1% water. To this mixture was added successively, with agitation, at one hour or longer intervals, the following: 25 grams of water; 25 grams of water; 25 grams of water; 10 grams of water; 100 grams of water; and 100 grams of the polyethylene oxide. After 5 hours of additional stirring, the viscosity (Brookfield Viscometer) was 8500 cps, at a polymer solids level of 6.5%. Including the methanol contained in the polymer and the polyethylene oxide as non-solvent, and the water contained in the polymer as part of the solvent, the ratio of solvent to non-solvent was about 0.8/1.

EXAMPLE II

This example illustrates the making of a polymer in convenient liquid form based on prior determinations of the optimum solvent to non-solvent ratios using a procedure as outlined in Example I above.

An ethylene glycol monoethyl ether (non-solvent)-water (solvent)-high molecular weight polyacrylamide solution was made after the optimum ratio of solvent to non-solvent had already been determined. To 100 grams of the ethylene glycol monoethyl ether and 100 grams of water was added 50 grams of partially processed cationic, high molecular weight polyacrylamide containing 23% polymer, 58% methanol and 19% water. After suitable agitation, the viscosity was 22,500 cps at 4.6% polymer solids.

EXAMPLE III

In this example a dry polymer was used to make an ethylene glycol monoethyl ether-water-high molecular weight polyacrylamide solution as follows:

To 48 grams of the ethylene glycol monoethyl ether and 52 grams of water was added, with agitation, 4.6 grams of the polymer in dry powder form. The solution was stirred for 4 hours. Finally, 30 grams of ethylene glycol monoethyl ether was added with agitation. The final viscosity was 1675 cps at 3.8% polymer solids.

EXAMPLE IV

Various solvent systems were tested in trying to make solutions of cationic and anionic polyacrylamides using the procedures outlined in Examples I-III. The cationic polyacrylamides were copolymers of acrylamide with diethylaminoethylacrylate methosulphate at a weight ratio of 80:20 and having a molecular weight of about 5,000,000–10,000,000. The anionic polymer was a copolymer of acrylamide and sodium acrylate at a weight ratio of 80:20 and had a molecular weight of about 10,000,000–20,000,000. The preparation of acrylamide polymers and copolymers are considered to be well within the skill of the art as, for example, disclosed by U.S. Pat. No. 3,573,263. In some of the tests conducted, the polymer was partially processed, i.e., it contained some water and methanol. The methanol contained in the polymer was considered part of the non-solvent, and the water contained therein was considered part of the solvent. The results are reported in Table I below. The viscosities reported were determined using a Brookfield LVT Model Viscometer.

straight line, the "approximate viscosities" obtained do, in the opinion of the present inventor, provide a representative comparison of the viscosities of the inventive

TABLE 1

| Test | Solvent | % Solvent in Mixture | Non-Solvent | % Non-Solvent in Mixture | Total % Non-Solvent in Mixture | Polymer Solids % (by weight) | Viscosity | Polymer Type |
|---|---|---|---|---|---|---|---|---|
| 1 | Water | 46 | Ethylene Glycol Monoethyl Ether/Methanol | 42/12 | 54 | 4.6 | 22,500 | Cationic |
| 2 | Water | 40.2 | Ethylene Glycol Monoethyl Ether/Methanol | 43.5/16.3 | 59.8 | 6.8 | 48,250 | Cationic |
| 3 | Water | 40 | Ethylene Glycol Monoethyl Ether/Methanol | 44/16 | 60 | 4.6 | 11,000 | Cationic |
| 4 | Water | 46 | Ethylene Glycol Monoethyl Ether/Methanol | 42/12 | 54 | 4.9 | 30,000 | Anionic |
| 5 | Water | 51.5 | Diethylene Glycol Diethylene Ether/Methanol | 38.5/10 | 48.5 | 5.7 | 3,000 | Cationic |
| 6 | Water | 57 | Diethylene Glycol Diethylene Ether/Methanol | 30/13 | 43 | 4.6 | 13,500 | Cationic |
| 7 | Water | 57.7 | Diethylene Glycol Monobutyl Ether/Methanol | 30.8/11.5 | 42.3 | 7.2 | 30,000 | Cationic |
| 8 | Water | 46 | Polyethylene Glycol (Molecular Weight 350)/Methanol | 43/11 | 54 | 6.3 | 11,000 | Cationic |
| 9 | Water | 46 | Polyethylene Glycol (Molecular Weight 400)/Methanol | 43/11 | 54 | 6.3 | 21,000 | Cationic |
| 10 | Water | 44.5 | Polyethylene Glycol (Molecular Weight 600)/Methanol | 44.5/11 | 55.5 | 6.5 | 8,500 | Cationic |
| 11 | Water | 40 | Ethylene Glycol Monoethyl Ether | 60 | 60 | 3.8 | 1,675 | Cationic |
| 12 | Water | 36 | Ethylene Glycol Monoethyl Ether | 64 | 64 | 3.8 | 1,250 | Cationic |

EXAMPLE V

Using the procedures as outlined in Examples I, II and III, a series of tests were run in which a number of cationic polyacrylamide-methanol-water solutions according to the present invention were made.

Attempts at making corresponding aqueous solutions of the polymers were unsuccessful. To provide a numerical comparison of the inventive polymers in convenient liquid form with aqueous polymer solutions, the "approximate viscosities" of the corresponding aqueous solutions were determined as follows. Aqueous solutions of the cationic polyacrylamide were made at different polymer concentrations. Viscosity versus polymer concentration was then plotted and a straight line drawn through the points on the graph. This straight line was extrapolated to provide an "approximate viscosity" of the corresponding aqueous polymer solution. While the actual viscosity values plotted against actual polymer concentration would most likely not yield a polymer solutions and the corresponding aqueous solutions. The comparative viscosities are reported below in Table 2. The actual viscosities for the inventive solutions were determined by using an LVT Model Brookfield Viscometer.

TABLE 2

| Test | % Methanol (by weight) of total Methanol-Water-Mixture | % Polymer Solids (by weight) | Viscosity (cps) | Approximate Viscosity of Corresponding Aqueous Solution |
|---|---|---|---|---|
| 13 | 60 | 8.7 | 35,000 | >1,000,000 |
| 14 | 65 | 13.8 | 15,500 | Rigid Gel |
| 15 | 58 | 11.2 | 79,000 | Rigid Gel |
| 16 | 63 | 14.2 | 1,750 | Rigid Gel |
| 17 | 64 | 5.4 | 2,850 | >100,000 |
| 18 | 60 | 4.5 | 198 | 100,000 |
| 19 | 57 | 6.8 | 2,250 | >100,000 |
| 20 | 60 | 9.0 | 39,500 | >1,000,000 |
| 21 | 65 | 10.0 | 70,000 | >1,000,000 |
| 22 | 60 | 11.3 | 6,300 | >1,000,000 |
| 23 | 58 | 9.5 | 77,000 | >1,000,000 |
| 24 | 58 | 11.6 | 50,000 | Rigid Gel |
| 25 | 70 | 10.6 | 550 | Rigid Gel |
| 26 | 72 | 8.5 | 10,250 | >1,000,000 |
| 27 | 88 | 4.3 | 8 | 100,000 |

EXAMPLE VI

A series of tests were conducted to determine the effect, if any, of surfactants on the inventive polymer solutions. The solutions were cationic polyacrylamide-methanol-water solutions. The methanol was used as the non-solvent and the water was used as the solvent. The results are reported in Table 3 below; the reported viscosities were determined using an LVT Model Brookfield Viscometer. The quantities of methanol are reported as % of the total solvent, non-solvent mixture on a weight basis. The quantities of the surfactants reported are based on the total amount of polymer, solvent, non-solvent and surfactant in the solution.

TABLE 3

| Test | % Methanol | Surfactant | % Surfactant | % Polymer Solids | Viscosity (cps) |
|---|---|---|---|---|---|
| 28 | 55 | Diethyleneglycol Oleyl Ether | 0.1 | 12.8 | 12,500 |

TABLE 3-continued

| Test | % Methanol | Surfactant | % Surfactant | % Polymer Solids | Viscosity (cps) |
|---|---|---|---|---|---|
| 29 | 55 | Diethyleneglycol Oleyl Ether | 4.2 | 11.1 | 10,000 |
| 30 | 74 | Diethyleneglycol Oleyl Ether | 2.5 | 6.3 | 10 |
| 31 | 83 | Diethyleneglycol Oleyl Ether | 3.1 | 7.8 | 7.5 |
| 32 | 84 | Sorbitan Monooleate/Sorbitan Trioleate | 0.4/0.1 | 8.2 | 6 |
| 33 | 82 | Diethyleneglycol Oleyl Ether | 1.9 | 12.5 | 3,400 |

As clearly demonstrated in Table 3, the surfactants can be used in practicing the invention.

EXAMPLE VII

In an additional series of tests, different mixing devices were utilized in making the inventive polymer solutions according to the procedures as outlined in Examples I–III above. The inventive polymer solutions were successfully made using a blender, a laboratory propeller-type stirrer, a planetary mixer, a Cowles dissolver, and a mixer-emulsifier.

EXAMPLE VIII

Tests were conducted to demonstrate that various forms of the polymer can be used in practicing the present invention. The polymer was the cationic polyacrylamide described in Example IV and it was fed to the solvent, non-solvent mixture as a soft gel and a dry powder. The results are reported below in Table 4. The non-solvent was methanol, and the % methanol reported is based on the total solvent, non-solvent mixture. Water was used as the solvent. The viscosities reported were determined using an LVT Model Brookfield Viscometer.

TABLE 4

| Test | % Methanol | % Polymer Solids | Viscosity (cps) | Polymer Form |
|---|---|---|---|---|
| 34 | 60 | 11.3 | 6,300 | Soft Gel |
| 35 | 69 | 11.7 | 15,500 | Dry |

The cationic polymer in each of Examples I–III above is the cationic polyacrylamide described in Example IV. The same polymer was also used in Example VI.

Convenient liquid form polymers made according to the present invention were observed by the present inventor to dissolve very rapidly in water. For example, complete dissolution was observed in 10 minutes when such liquid form polymers were added to dilution water with stirring.

I claim:

1. A method of increasing the concentration of a polymer in a first solvent in which it is soluble comprising forming a solution of the polymer with the first solvent and a second solvent which is cosoluble with the first solvent and in which the polymer is not soluble, wherein the solution is formed by forming an initial solution of the first and second solvents and adding the polymer thereto.

2. The method of claim 1, wherein the second solvent comprises more than 25% of the initial solution.

3. The method of claim 2, wherein the polymer is added in an amount of from about 4% to about 50% of the total amount of the first solvent, second solvent and polymer.

4. The method of claim 2, wherein the polymer is added in an amount greater than 5% of the total amount of the first solvent, second solvent and polymer.

5. The method of claim 4, wherein the first solvent comprises at least 17% of the initial solution.

6. The method of claim 1, wherein the polymer is a water-soluble vinyl addition polymer.

7. The method of claim 6, wherein the polymer is a polyacrylamide.

8. The method of claim 5, wherein the first solvent is water.

9. The method of claim 8, wherein the polymer is a copolymer of acrylamide and diethylaminoethylacrylate methosulfate.

10. The method of claim 7, wherein the second solvent is at least one member selected from the group consisting of a lower alcohol, ether, glycol and methanol.

11. The method of claim 8, wherein the polymer is a copolymer of acrylamide with sodium acrylate.

12. The method of claim 1, wherein a surfactant is also added to the mixture.

13. The method of claim 10, wherein a surfactant is also added to the mixture, and wherein the second solvent is ethylene glycol monoethyl ether and methanol.

14. A polymer in convenient liquid form comprising a non-gel-like solution of a first solvent in which the polymer is soluble, a second solvent which is cosoluble with the first solvent and in which the polymer is not soluble and said polymer, wherein the polymer comprises from about 4% to 50% of the total amount of said solution.

15. A polymer in convenient liquid form according to claim 14, wherein the polymer comprises more than 5% of the total amount of said solution.

16. A polymer in convenient liquid form according to claim 15, wherein the second solvent comprises more than 25% of the total amount of the first and second solvents.

17. A polymer in convenient liquid form according to claim 16, wherein the first solvent comprises at least 17% of the total amount of the first and second solvents.

18. A polymer in convenient liquid form according to claim 16, wherein the first solvent comprises from about 25% to 75% of the total amount of the first and second solvents.

19. A polymer in convenient liquid form according to claim 14, wherein the polymer is a high molecular weight water-soluble vinyl addition polymer.

20. A polymer in convenient liquid form according to claim 18, wherein the polymer is a high molecular weight water-soluble vinyl addition polymer.

21. A polymer in convenient liquid form according to claim 19, wherein the polymer has a molecular weight of at least about 100,000.

22. A polymer in convenient liquid form according to claim 18, wherein the polymer is a polyacrylamide.

23. A polymer in convenient liquid form according to claim 18, wherein the polymer is a copolymer of acrylamide and sodium acrylate.

24. A polymer in convenient liquid form according to claim 17, wherein said first solvent is water.

25. A polymer in convenient liquid form according to claim 24, wherein said second solvent comprises at least one member selected from the group consisting of glycol, ether and a lower alcohol.

26. A polymer in convenient liquid form according to claim 25, wherein said second solvent comprises ethylene glycol monoethyl ether and methanol.

27. A polymer in convenient liquid form according to claim 14, which further comprises a surfactant.

28. A polymer in convenient liquid form according to claim 18, which further comprises a surfactant.

29. A polymer in convenient liquid form according to claim 14, wherein said polymer has a molecular weight of at least about 100,000.

30. A polymer in convenient liquid form according to claim 24, wherein said second solvent comprises a lower alcohol.

31. A polymer in convenient liquid form according to claim 26, wherein the polymer is a copolymer of acrylamide and diethylaminoethylacrylate methosulfate.

32. A polymer in convenient liquid form according to claim 26, wherein the polymer is a copolymer of acrylamide and sodium acrylate.

* * * * *